(12) United States Patent  
Costantino et al.

(10) Patent No.: US 9,034,776 B2
(45) Date of Patent: May 19, 2015

(54) METHOD TO PRODUCE A COMPOSITE MATERIAL

(75) Inventors: Stephan Costantino, Saint Louis (FR); Marcel Roellinger, Illzach (FR)

(73) Assignee: Huntsman International LLC, The Woodlands, TX (US)

(*) Notice: Subject to any disclaimer, the term of this patent is extended or adjusted under 35 U.S.C. 154(b) by 259 days.

(21) Appl. No.: 13/381,106

(22) PCT Filed: May 31, 2010

(86) PCT No.: PCT/EP2010/057529
§ 371 (c)(1),
(2), (4) Date: Jan. 26, 2012

(87) PCT Pub. No.: WO2011/000646
PCT Pub. Date: Jan. 6, 2011

(65) Prior Publication Data
US 2012/0122360 A1    May 17, 2012

(30) Foreign Application Priority Data
Jun. 29, 2009 (EP) .................... 09164005

(51) Int. Cl.
*E04C 5/07* (2006.01)
*C08J 5/04* (2006.01)

(52) U.S. Cl.
CPC . *E04C 5/07* (2013.01); *E04C 5/073* (2013.01); *C08J 5/04* (2013.01); *C08J 2363/00* (2013.01)

(58) Field of Classification Search
CPC ........... C08J 5/04; C08J 2363/00; E04C 5/07; E04C 5/073
USPC ............... 442/156, 175; 427/384, 385.5, 386; 264/171.13
See application file for complete search history.

(56) References Cited

U.S. PATENT DOCUMENTS

| | | | |
|---|---|---|---|
| 3,441,522 A | | 4/1969 | Soldatos et al. |
| 5,459,208 A | * | 10/1995 | Marten et al. ................. 525/523 |
| 5,681,014 A | * | 10/1997 | Palmer ........................ 244/219 |
| 6,274,682 B1 | * | 8/2001 | Corley et al. ................. 525/533 |
| 6,485,834 B1 | * | 11/2002 | Mariaggi et al. .............. 428/418 |

FOREIGN PATENT DOCUMENTS

| | | | | |
|---|---|---|---|---|
| EP | 1 473 329 | | 11/2004 | |
| WO | WO 2008064115 A1 | * | 5/2008 | ............. C08G 59/50 |

OTHER PUBLICATIONS

International Search Report regarding corresponding application No. PCT/EP2010/057529, dated Dec. 15, 2010.

* cited by examiner

*Primary Examiner* — Jeremy R Pierce

(57) ABSTRACT

Method of producing an elastic composite material comprising the step of impregnating a fiber fabric with a liquid epoxy system comprising a non-aromatic epoxy resin and a hardener, and curing the impregnated fabric, whereby the epoxy system exhibits a tensile modulus lower than 15 MPa after cure.

7 Claims, 1 Drawing Sheet

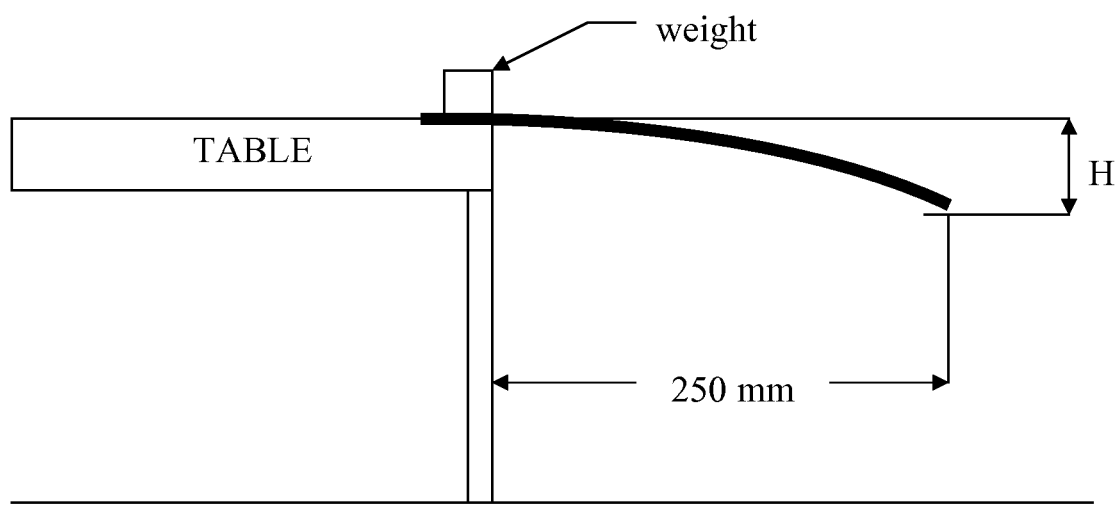

METHOD TO PRODUCE A COMPOSITE MATERIAL

CROSS REFERENCE TO RELATED APPLICATIONS

This application is the National Phase of International Application PCT/EP2010/057529 filed May 31, 2010 which designated the U.S. and which claims priority to European Patent Application (EP) 09164005.2, filed Jun. 29, 2009. The noted application is incorporated herein by reference.

The present invention concerns a method for producing composite materials.

Composite materials exhibit a second phase (reinforcement) dispersed and/or distributed in a first phase (matrix) and are commonly used as structural materials.

Resistant and stiff fibers can for example be introduced in a softer matrix, so as to increase the strength and stiffness of said matrix. This will create a composite material. At the same time, the desired mechanical properties of the matrix are not lost and the composite material exhibits typically a toughness, a flexibility and a ductile behavior much higher than the ones exhibited by the reinforcing fibers alone.

Epoxy based composite materials are presently produced for example by impregnating a fabric of carbon, glass, aramide or natural fibers with a liquid curable system comprising typically an epoxy resin and a suitable hardener and afterwards curing the impregnated fabric at room temperature or higher temperatures for few minutes up to some days.

Methods for preparing such composites can be found for example in U.S. Pat. No. 4,107,128 or U.S. Pat. No. 6,485,834.

The cured system, in which the fibers are dispersed, confers the composite material the required mechanical properties, in particular an acceptable strength and the demanded elastic properties, which can be characterized for example by the elastic modulus E. The elastic modulus measured in tension tests is called tensile modulus, while the elastic modulus measured in flexion tests is called flexural modulus. Tensile and flexural modulus are theoretically identical for isotropic materials.

Typical reinforcements are carbon, glass, aramide or natural fibers, while typical curable systems comprise, for example, epoxy resins and suitable hardeners, which after curing build a solid matrix exhibiting mechanical strength and elastic properties.

Since fibers are introduced in the composites to increase the strength and stiffness, the curable system chosen for the composite material exhibits also normally a high strength and stiffness.

Consequently, the curable system of the composite is traditionally chosen among curable epoxy system which exhibits a relatively high strength and stiffness, and a flexural modulus generally higher than 40 MPa, even when cured without any reinforcement fiber.

For certain applications however, for example in the automotive and sport industry, not only high strength but also high flexibility, high toughness and low hardness are required, in order to satisfy all requirements of the mechanical part.

An example are bodywork components on competition race cars and car wings.

During competitive races, parts on the cars made of standard composite are often broken and can be extremely hazardous due to the shards and splinters.

These parts should, however, withstand the inevitable low to medium energy bumps and knocks without breaking. A material forming these parts should therefore exhibit excellent impact, abrasion and tear resistance, good elongation, tensile strength and high flexibility.

For these particular applications, requirements are:
Improved safety;
Better car performance (no or less pit stop required to change damaged part, aerodynamic integrity is maintained throughout the duration of the race);
Lower maintenance costs (no part replacement).

Current epoxy systems developed for classical composite applications cannot match all these requirements, in particular concerning the flexibility, the toughness and the hardness.

Composites based on many epoxy systems exhibit high strength and are effective to build structural parts, but exhibit a too high stiffness and flexural modulus.

In addition, conventional epoxy systems using bisphenol based epoxy resins always exhibit an unaesthetic yellow color or hazy appearance after curing, the intensity of which gradually increases with the time during which they are exposed to light. Such materials are not resistant and stable in respect to the exposure to ultraviolet radiation. Such coloration or hazy appearance cannot be accepted at all in certain applications, where the aesthetical appearance is important.

The problem to be solved by the present invention is therefore to produce an epoxy based composite material exhibiting excellent impact, high flexibility and correspondingly low flexural modulus, a good transparency, resistance and stability in respect to the ultraviolet radiation regarding yellowness and gloss.

The problem is solved according to the features of claim 1.

According to our invention, a solid elastic composite material is produced by impregnating a fiber fabric with a liquid epoxy system comprising a non-aromatic epoxy resin and a hardener,
and by curing the impregnated fabric, whereby the neat epoxy system cured without fibers exhibits a tensile modulus lower than 15 MPa, preferably lower than 10 MPa, more preferably lower than 5 MPa.

Elastic composite materials are materials in the solid state and comprise at least two distinct phases. They exhibit an elastic deformation when subjected to a certain force or stress. Such materials are therefore deformed by the application of a predetermined force or stress, but recover completely their original form and geometry, when the applied force or stress is removed, according to the physical definition of elastic behavior and deformation.

Since the epoxy system (matrix) of the composite exhibits a very low tensile modulus, a correspondingly highly flexible composite is obtained with surprising and unexpected mechanical properties: the strength is surprisingly good enough for structural applications, but at the same time the flexibility, elongation and toughness are surprisingly high with a very low tensile modulus. New applications are consequently made possible for these types of materials.

The man skilled in the art would have been prevented from combining the fibers with such a highly flexible epoxy system by the prejudice that such a highly flexible epoxy system would have been unsuited for any structural and mechanical application, because of its very low modulus and stiffness.

At the same time, since the epoxy resin used according to the invention is non-aromatic, no or very little yellow color and yellowing is exhibited by the produced material, which exhibits therefore good aesthetical properties and a transparent color, even after a long exposure to light and ultraviolet radiation. The produced material is resistant and stable in respect to the ultraviolet radiation.

According to a preferred embodiment of the invention, the composite material according to the invention exhibits a flexural modulus lower than 15 GPa, preferably lower than 10 GPa, more preferably lower than 5 GPa.

Materials with acceptable strength and with a low elastic modulus can be produced in a simple and cheap way, so that new applications are opened for epoxy based composite materials.

According to another preferred embodiment of the invention, the epoxy system cured at 25° C. for one day then postcured at 40° C. for 16 hours has an onset of the glass transition temperature Tg at a temperature lower than 0° C.

Since the composite according to the present invention is usually employed at temperatures higher than 0° C., such material will exhibit an exceptionally high ductility and low elastic modulus, due to the fact that the epoxy system is in a rubbery state. Traditionally, cured epoxy systems are used for structural applications at temperatures lower than Tg, so as to take advantage of the stiffness of the epoxy based matrix in its glassy state.

The use of an epoxy system at temperatures higher than Tg for structural applications according to a preferred embodiment of the invention is innovative, as it leads to composite materials exhibiting an unexpected and surprising toughness and low elastic modulus.

According to another preferred embodiment of the invention, the epoxy system cured at 25° C. for one day then postcured at 40° C. for 16 hours has an onset of the glass transition temperature Tg at a temperature lower than −22° C. In this way, the epoxy system remains in a rubbery state up to temperatures of −22° C. and the composite material can be used for outdoor applications during winter conditions.

According to another preferred embodiment of the invention, the uncured epoxy system exhibits a viscosity of 450 mPa·s or less at 25° C. Viscosity of uncured epoxy system was measured with the rheometer AR 1500ex commercially available from TA instruments using a 40 mm diameter plate, a Peltier plate, an angular velocity of 50 rpm and a gap between plates of 200 μm.

The fiber fabric can be very conveniently infiltrated by the liquid epoxy system due to its very low viscosity. Hence, the composite manufacturing operation is easy to accomplish, as it does not require expensive specialist equipment. In addition, processing is very simple, making the parts from a single shell mould quick and particularly cost effective.

According to a further preferred embodiment of the invention, the cured epoxy system exhibits a yellowness index lower than 20 after an exposure of 200 hrs in a weatherometer (WOM) Xenon Ci 5000, commercially available from Atlas Material Technology. Accelerated weathering was performed under SAE J 1960 test conditions, which are described in U.S. Pat. No. 6,476,158. Test method SAE J 1960 is used by the North American Automotive Industry for the evaluation of the weatherabilty of components used on the exterior of an automobile.

Since the epoxy resins used for the production of the composite are non-aromatic, good transparency, brightness and UV resistance are exhibited by the produced composite, which is also suited for applications with high aesthetic requirements.

According to a further preferred embodiment of the invention, the non-aromatic epoxy resin is selected from aliphatic epoxy resins having at least two epoxy groups per molecule or a mixture of at least two aliphatic epoxy resins having an average epoxide functionality of at least 1.5.

According to a further preferred embodiment of the invention, a preferred epoxy resin is a diglycidyl ether.

According to a further preferred embodiment of the invention, the fiber fabric comprises carbon, glass, natural, synthetic, e.g. aramide fibers.

Such fibers allow for the required mechanical strength, even when a soft curable system (matrix) is used, which exhibits an onset of Tg <0° C.

According to a further preferred embodiment of the invention, the composite material comprises 20 to 80 vol. %, preferably 35 to 65 vol. %, more preferably 40 to 60 vol. % of fibers, based on the total volume of the composite.

If the volume percentage of fibers is too high, the composite material is brittle and exhibits high stiffness. If the volume fraction of fibers is too low, the composite material exhibits low strength, since the epoxy matrix is very soft.

The versatility of this highly flexible composite material makes it suitable for use in a wide range of manufacturing applications requiring flexibility of the final part.

Applications are foreseen in new and non common composite areas where flexibility, cosmetic and safety aspects—combined together or not—are required.

A preferred application is the high performances automotive and motor-bike industries (racing cars, body work, car wings), whereby the method according to the invention allows all mechanical requirements to be satisfied.

However, opportunities can be envisaged in any non structural composite component or finished part in industries, such as:
1) fashion and design goods (e.g. ties, clothing, shoes, watch bands, luggages, furnitures);
2) marine (e.g. carbon sails);
3) sport (e.g. tibia protection devices for soccer players, body protection for motor bikes riders);
4) ballistic (e.g. body guards armours).

The composite material according to the invention can be advantageously introduced into concrete for construction applications, so as to decrease the weight of the concrete and to increase its toughness and elastic properties.

Epoxy Resins

The used epoxy resins can be monomeric, oligomeric or polymeric, on the one hand, aliphatic, heterocyclic on the other hand.

Examples are polyglycidyl ethers and poly(β-methylglycidyl)ethers, which are obtainable by reaction of a compound containing at least two free alcoholic groups per molecule with epichlorohydrin under alkaline conditions, or in the presence of an acid catalyst, with subsequent treatment with an alkali. These ethers can be prepared with poly(epichlorohydrin) from acyclic alcohols, such as ethylene glycol, diethylene glycol and higher poly(oxyethylene)glycols, propane-1,2-diol and poly(oxypropylene)glycols, propane-1,3-diol, butane-1,4-diol, poly(oxytetramethylene)glycols, pentane-1,5-diol, hexane-1,6-diol, hexane-2,4,6-triol, glycerol, 1,1,1-trimethylolpropane, pentaerythritol and sorbitol, from cycloaliphatic alcohols, such as quinitol, bis-(4-hydroxycyclohexyl)methane, 2,2-bis-(4-hydroxycyclohexyl)propane and 1,1-bis-(hydroxymethyl)cyclohex-3-ene.

Other examples, which may be mentioned, are polyglycidyl esters and poly(6-methylglycidyl) esters, which can be obtained by reaction of a compound containing two or more carboxylic acid groups per molecule with epichlorohydrin, glycerol dichlorohydrin or β-methylepichlorohydrin in the presence of an alkali. Such polyglycidyl esters can be derived from aliphatic polycarboxylic acids, for example oxalic acid, succinic acid, glutaric acid, adipic acid, pimelic acid, suberic acid, azelaic acid, sebacic acid or dimerized or trimerized linoleic acid, from cycloaliphatic polycarboxylic acids, such as tetrahydrophthalic acid, 4-methyltetrahydrophthalic acid, hexahydrophthalic acid and 4-methylhexahydrophthalic acid, and from perhydro aromatic of polycarboxylic acids, such as phthalic acid, isophthalic acid and terephthalic acid.

Epoxy components based on hydrogenated or perhydrogenated aromatic compounds such as perhydrogenated bisphenol A or on cycloaliphatic glycidyl epoxy compounds are especially preferred. Hydrogenated or perhydrogenated aromatic means the aromatic double bonds are partially or fully hydrogenated. Other hydrogenated aromatic glycidyl epoxies may be used. Ternary mixtures of these resins above with for example aliphatic multiglycidyl epoxy resins are also contemplated. Amongst these multiglycidyl epoxy resins are those derived from short or long chain multi alcohols.

Also conceivable is the use of liquid pre-reacted adducts of epoxy-containing compounds, such as those mentioned above, with suitable hardeners for epoxy resins. It is of course also possible to use liquid mixtures of liquid in the novel compositions.

The following are examples of commercial epoxy products suitable for use in the present invention: Heloxy™ 48 (trimethylol propane triglycidyl ether, supplied by Hexion Specialty Chemicals, Inc.); Heloxy™ 107 (diglycidyl ether of cyclohexanedimethanol, supplied by Hexion Specialty Chemicals, Inc.); Epalloy® 5000 and Epalloy® 5001 (epoxidized hydrogenated bisphenol A, supplied by CVC Specialties Chemicals, Inc.); Hexahydrophthalic acid diglycidylester such Epalloy® 5200 (supplied by CVC Specialties Chemicals, Inc.) and Araldite® CY 184 (supplied by Huntsman International LLC); Araldite® DY-N (neopentyl glycol diglycidyl ether, supplied by Huntsman International LLC); Erysis® GE-23 (diglycidyl ether of dipropylene glycol, supplied by CVC Specialties Chemicals, Inc.); Polypropylenglycol diglycidyl ether such Araldite® DY-F (supplied by Huntsman International LLC) and Erysis® GE-24 (supplied by CVC Specialties Chemicals, Inc.); Araldite® DY-L (polypropylenglycol triglycidyl ether, supplied by Huntsman International LLC); Erysis® GE-35 (triglycidyl ether based on castor oil, supplied by CVC Specialties Chemicals, Inc.); Triglycidyl ether based on propoxlated glycerin such Erysis® GE-36 (supplied by CVC Specialties Chemicals, Inc.) and Heloxy™ 84 (supplied by Hexion Specialty Chemicals, Inc.); Erysis® GE-120 (diglycidyl esther based on dimer acid, supplied by CVC Specialties Chemicals, Inc.)

Table 1 shows three preferred epoxy resins (Araldite® DY-H, Araldite® DY-D, Araldite® DY-C) used to carry out the invention and two epoxy resins (Araldite® LY 556, Araldite® DY-T) used to produce the comparative examples. Names and viscosity measured at 20° C. are indicated.

TABLE 1

| Name | Commercial name | Viscosity (mPa · s), 20° C. |
|---|---|---|
| Difunctional and non aromatic epoxy resin | | |
| 1,6-Hexanediol diglycidyl ether | Araldite ® DY-H | 21-31 |
| 1,4-Butanediol diglycidyl ether | Araldite ® DY-D | 15-25 |
| 1,4-Cyclohexanedimethanol diglycidyl ether | Araldite ® DY-C | 60-90 |
| Difunctional and aromatic epoxy resin | | |
| Diglycidyl ether of bisphenol A-based epoxy resins | Araldite ® LY 556 | 10000-12000 |
| Trifunctional and non aromatic epoxy resin | | |
| Trimethylolpropane triglycidyl ether | Araldite ® DY-T | 100-200 |

Araldite® DY-H, Araldite® DY-D and Araldite® DY-C are non-aromatic and difunctional with two epoxy groups. They are characterized by viscosities lower than 100 mPa·s at 20° C.

Araldite® LY 556 is an aromatic epoxy resin.

Araldite® DY-T is non-aromatic and trifunctional with three epoxy groups.

According to a preferred embodiment of the present invention, the non-aromatic epoxy resin is selected from aliphatic epoxy resins having at least two epoxy groups per molecule or a mixture of at least two aliphatic epoxy resins having an average epoxide functionality of at least 1.5.

An average epoxide functionality less than 1.5 does not allow for sufficient polymerization and mechanical strength.

Hardeners

The used hardener system comprises an amine compound having an average amine functionality of at least 2.

The amine compound having an average amine functionality of at least 2 is preferably selected from alkylenepolyamines or polyalkylenepolyamines. Preferred examples are trimethyl hexamethylene diamine, diethylenetriamine, triethylenetetramine, tetraethylenepentamine, dipropylenetriamine or tripropylenetetramine; polyoxyalkylenepolyamines or alkylenepolyamines such as polyoxyethylene- and polyoxypropylene diamines and triamines; cycloaliphatic diamines or cycloaliphatic polyamines having amino groups or aminoalkyl groups attached to the ring; adducts obtained from by reaction of epoxy resins with aliphatic, cycloaliphatic or aralphatic as described above with at least two amino groups or more; N-aminoalkyl piperazines with at least two amino groups or more; and polyaminoamides, for example reaction products of polyalkylenepolyamines, such as those mentioned above, with polymerised unsaturated fatty acids, e.g. polymerised vegetable oil acids such as trimerised linoleic or ricinoleic acids. According to the invention, any mixture of these amines may be used.

Table 2 shows two preferred hardeners (Aradur® 53 S and TCD-diamine) used to carry out the invention. Names, and viscosities at 20° C. or 25° C. are indicated. All these compounds are commercially available under the commercial names indicated in Tables 1 and 2. TCD-Diamine is commercially available from OXEA GmbH.

TABLE 2

| Name | Commercial name | Viscosity (mPa · s) |
|---|---|---|
| Difunctional and non aromatic amine | | |
| 3(4),8(9)-Bis-(aminomethyl)-tricyclo[5.2.1.0$^{2.6}$]decane | TCD-diamine | 85 (measured at 20° C.) |
| Difunctional and aromatic amine | | |
| Formulated cycloaliphatic polyamine hardener | Aradur ® 53 S | 300-400 (measured at 25° C.) |

Epoxy Systems (Resin Plus Hardener)

Different epoxy resins and hardeners were mixed at 25° C. in specified proportions (parts by weight=pbw) to produce hardenable "epoxy systems". The viscosity of the system was measured at 25° C. and 60° C. Afterwards the epoxy systems were cured at 25° C. for one day, then postcured at 40° C. for 16 hours. Then glass transition temperature Tg, yellowness index, gloss, Shore A, Shore D and tensile properties of obtained cured epoxy systems were measured and physically characterized using analytical equipment and test conditions as described below.

The glass transition temperature Tg of cured epoxy samples of 5 to 15 mg in crimped aluminum pans was measured with the Differential Scanning calorimeter Mettler Toledo DSC 822 operating on a Windows XP platform using an immersion cooler Haake EK 90/MT as cooling unit and nitrogen (20 ml/min) as the purge gas. Temperature scans were performed from −50° C. to +150° C. at 10 K/min. The DSC 822 was calibrated for temperature and heat flow with both indium and zinc standards using a calibration type single described in section 8 of the Star$^e$ Software user handbook (Mettler-Toledo AG 2008, ME-51710263 G, printed in Switzerland 0806/2.12). The resolution of the Mettler Toledo DSC 822 is 0.04 µW. The temperature accuracy and precision is 0.2° C.

The glass transition temperature Tg of cured epoxy samples (60 mm×10 mm×1 mm) was also measured according to ISO 6721 with the dynamic mechanical analyser DMA type RDS 2 from Rheometric scientific GmbH operating on a Windows XP platform using liquid nitrogen coolant. Temperature scans were performed from −100° C. to +150° C. at 2 K/min. These experiments were performed using aluminum flexural fixtures. The torque sensitivity of the Rheometric scientific GmbH is 2 g/cm. The temperature accuracy is +/−5° C.

Yellowness index and Gloss of cured epoxy samples of size 120 mm×50 mm×4 mm were measured at 23° C. in the middle of sample before (0 hrs) and after 200 hrs exposure in a WOM Xenon Ci 5000 under SAE J 1960 test conditions. As described in the literature (Meeten, G. H., *Optical Properties of Polymers*, Elsevier Applied Science, London, 1986, pp. 326-329), gloss is an optical property, which is based on the interaction of light with physical characteristics of a surface. It is actually the ability of a surface to reflect light into the specular direction. Materials with smooth surfaces appear glossy, while very rough surfaces reflect no specular light and therefore appear matt.

Yellowness index (YI) measurement was performed according to DIN 6167 with a Konika Minolta CM-2500 d spectrometer. Gloss measurement was performed with a ZEHNTER ZGM 1120 glossmeter with a 60° measuring angle.

Shore A and Shore D hardness of 10 mm thick cured epoxy sample were measured at 23° C. with a FRANK shore durometer. Pressure force on the durometer was applied by hand during at least 10 s and shore value was recorded.

Tensile measurements on cured epoxy samples (190 mm×20.5 mm×4 mm) were performed according to ISO 527 with a Zwick 1474 tensile tester at 23° C. The force sensitivity of the Zwick 1474 tensile tester was 0.01N and the displacement sensitivity was 0.2 µm.

Table 3a shows three preferred epoxy systems (1, 2 and 3) used to carry out the invention and table 3b shows three epoxy systems (4, 5 and 6) used to produce the comparative samples.

System 1, 2 and 3 disclose preferred epoxy systems used to carry out the invention, which comprise different contents of different aliphatic bi-functional epoxy resins. The viscosity of the liquid uncured epoxy systems 1, 2 and 3 is always lower than 170 mPa·s, both at 25° C. and 60° C. The cured neat epoxy systems 1, 2 and 3 always exhibit the onset of the glass transition temperature at temperatures lower than 0° C., according both to the DSC and DMA methods. The cured neat epoxy systems 1, 2 and 3 always exhibit a yellowing index lower than 18, even after 200 hrs exposure in WOM under SAE J 1960 test conditions. The Shore D hardness of the cured epoxy systems 1, 2 and 3 is always lower than 35.

The tensile modulus of the cured neat epoxy systems 1, 2 and 3 is always lower than 11 MPa.

Such properties make the epoxy systems 1, 2 and 3 very suitable for producing highly flexible composite materials according to the present invention.

System 4, 5 and 6 disclose epoxy systems used to produce comparative samples. System 4 comprises a tri-functional aliphatic epoxy resin, while systems 5 and 6 comprise an aromatic epoxy resin.

The viscosity of the liquid uncured epoxy systems 4, 5 and 6 is always higher than 500 mPa·s at 25° C. Methods of infiltration of the fibers are difficult with such high viscosities. The cured epoxy systems 5 and 6 exhibit a glass transition temperature higher than room temperature. At room temperature such systems are stiff. The cured epoxy systems 5 and 6 exhibit a yellowing index higher than 23 after 200 h exposure in WOM according to SAE J 1960 test method. They do not show a good transparency, brightness or UV resistance and they become more yellow as time passes. The Shore D hardness of the cured epoxy systems 4, 5 and 6 is always higher than 60. The hardness of these materials is so high that the Shore A hardness cannot be measured.

TABLE 3a

| | System based on aliphatic and difunctional epoxy resin | | |
|---|---|---|---|
| Epoxy system | 1 | 2 | 3 |
| Resin | Araldite ® DY-C | Araldite ® DY-D | Araldite ® DY-H |
| Hardener | Aradur ® 53 S | Aradur ® 53 S | Aradur ® 53 S |
| Mix ratio Resin/hardener (in parts by weight) | 100/67 | 100/96 | 100/75 |
| | Tg(onset)/Tg (middle) | | |
| DSC (° C.) | −4/3 | −13/−6 | −20/−13 |
| DMA (° C.) | −10.5/16.5 | −19/−4.5 | −22/−2.5 |
| | Viscosity of the "Epoxy system" (mPa · s) | | |
| Measured at 25° C. | 120 | 63 | 170 |
| Measured at 60° C. | 30 | 20 | 24 |
| | WOM (0 hrs/200 hrs) | | |
| Yellowness index | 9/17.0 | 7.5/not measurable | 5.5/17.5 |
| Gloss (60° angle) | 29/47 | 72/not measurable | 76/83 |
| | Hardness | | |
| Shore A | 69-70 | 75-78 | 72-75 |
| Shore D | 18 | 18/34 | 13-15/31 |
| | Tensile properties (ISO 527) | | |
| Tensile strength (MPa) | 1 | 1 | 1 |
| Ultimate elongation (%) | 20-30 | 7-9 | 9-10 |
| Tensile modulus (MPa) | 4-5 | 9-11 | 8-10 |

TABLE 3b

| Epoxy System | System based on aliphatic and tri-functional epoxy resin | System based on aromatic and di-functional epoxy resin | |
| --- | --- | --- | --- |
| | 4 | 5 | 6 |
| Resin | Araldite ® DY-T | Araldite ® LY 556 | Araldite ® LY 556 |
| Hardener | Aradur ® 53 S | Aradur ® 53 S | TCD-diamine |
| Mix ratio Resin/hardener (in parts by weight) | 100/94 | 100/94 | 100/27 |
| Tg(onset)/Tg (middle) | | | |
| DSC (° C.) | 17/24 | 31/37 | 126/128 |
| DMA (° C.) | | 21.5/39.5 | 127/141 |
| Viscosity of the "Epoxy system" (mPa · s) | | | |
| Measured at 25° C. | 500 | 1160 | 1870 |
| Measured at 60° C. | 67 | 180 | 140 |
| WOM (0 hrs/200 hrs) | | | |
| Yellowness index | | 7.4/23.6 | 11.4/30.1 |
| Gloss (60° angle) | | 74/59 | 45/17 |
| Hardness | | | |
| Shore A | not measurable | not measurable | not measurable |
| Shore D | 60 | 78 | 86 |
| Tensile properties (ISO 527) | | | |
| Tensile strength (MPa) | 9-10 | 35-37 | not measurable |
| Ultimate elongation (%) | 31-34 | 12-24 | not measurable |
| Tensile modulus (MPa) | 50-65 | 1600-1700 | not measurable |

The tensile modulus of the cured epoxy systems 4, 5 and 6 is higher than 50 MPa. They therefore exhibit a high stiffness and are not flexible. The cured epoxy system 6 was so brittle that it was not possible to measure its tensile properties.

Such properties make the epoxy systems 4, 5 and 6 unsuitable for producing high flexible composite materials according to the present invention.

Production of Composites

Composite materials were produced by impregnating a fiber fabric with the liquid epoxy systems 1 (inventive) and 6 (comparative) and curing the impregnated fabric at 25° C. for 1 day, then postcuring 16 hrs at 40° C. Alternatively, the impregnated fabrics can be cured in oven at 60° C. for 2 hours.

One layer of carbon fabric (Hexcel 43200) 2×2 twill 200 g/m² with dimension 275 mm×110 mm and 2 layers of glass fabric (Hexcel 2116) plain 106 g/m² with dimension 275 mm×110 mm were impregnated with approximately 130 g/m² of resin during each experiment by infusion process as described in U.S. Pat. No. 5,052,906 (SCRIMP™).

The carbon fabric (Hexcel 43200) is a carbon 2×2 twill. Each tow of each direction is crossing 2 tows of the other direction. The tow is 3K, i.e. composed by 3000 filaments of high resistance carbon with a diameter of 7 microns each. The areal weight is 200 g/m². The glass fabric (Hexcel 2116) is a plain weave fabric. Each tow of each direction is crossing one tow of the other direction. The tow has 24 filaments (ref EC7 22) in warp and 23 filaments (Ref EC7 22) in weft. The areal weight is 106 g/m².

In order to impregnate the fabric, vacuum (5 mbar residual pressure) was applied to draw the liquid epoxy system into the fiber fabric. Any direct composite processing method is applicable to impregnate the fabric, such as Wet lay up, Infusion, Resin Transfer Moulding®, Filament Winding, Press Molding and Poltrusion. (see for example: Daniel Gay, "Materiaux Composites", Hermes edition, Paris, 1997)

Such types of processing are made possible by the low viscosity of the epoxy systems used according to the preferred embodiments of the present invention.

In order to compare the flexibility of the produced composites, applicant performed several measurements on the impregnated and cured fabrics of carbon fibers (Hexcel 43200) or glass fibers (Hexcel 2116), according to the following procedure.

The sample is placed on a table as shown in FIG. 1 and fixed with a weight.

The deflection H of the specimen under its own weight was determined at 23° C.

In order to calculate the modulus in MPa it was assumed that the sample is a beam that deflects under a constant force: its own weight.

The elastic modulus (column 6, Table 4) was calculated according to the following formula:

$$E = \frac{P \times L^4}{8 \times H \times I}$$

where:
P is the linear weight of sample (column 2, Table 4)
L is the length (column 3, Table 4)
H is the deflection (column 4, Table 4)
I is the inertia modulus of the sample:

$$I = B \times h^3 / 12$$

where:
B is the width of the sample (110 mm)
h is the thickness (column 5, Table 4)

The fiber volume content of the composite sample is calculated according to the following formula (see for example: Daniel Gay, "Materiaux Composites", Hermes edition, Paris, 1997, reference p 59):

$$h = \frac{n_p \times m_{of}}{\rho_f \times V_f}$$

where:
$n_p$ is the number of plies
$m_{of}$ is Fabric areal weight (column 7, Table 4)
$\rho_f$ is the density of fiber (column 8, Table 4)
$V_f$ is the fiber volume content (column 9, Table 4)
h is the thickness of sample (column 5, Table 4)

The results of the measurements and calculations are summarized in Table 4.

TABLE 4

|  | Linear weight of sample P (g/mm) | Length L (mm) | Deflection H (mm) | Thickness h (mm) | Modulus E (MPa) | Fabric areal weight $m_{af}$ (g/m$^2$) | Density of fiber $\rho_f$ (g/cm3) | Fiber volume content $V_f$ |
|---|---|---|---|---|---|---|---|---|
| System 6, Hexcel 43200 | 0.04 | 250 | 27 | 0.26 | 44000.8 | 200 | 1.78 | 43.2% |
| System 1, Hexcel 43200 | 0.043 | 250 | 145 | 0.29 | 6347.3 | 200 | 1.78 | 38.7% |
| System 6, Hexcel 2116 | 0.042 | 250 | 86 | 0.25 | 16316.1 | 212 | 2.56 | 33.1% |
| System 1, Hexcel 2116 | 0.044 | 250 | 187 | 0.27 | 6240.3 | 212 | 2.56 | 30.7% |

Table 4 demonstrates that composite materials produced with the epoxy system 1 according to our invention exhibit a much higher deflection H (>140 mm) and a much lower elastic modulus E (<6.5 GPa) than composites materials produced using the epoxy system 6.

Surprisingly high deflections and unexpected low elastic modulus can be achieved in composite materials with the method according to the present invention. Such composites can be used for new applications where both strength and flexibility are required at the same time.

The invention claimed is:

1. Method of producing an elastic composite material comprising the step of
   a) impregnating a fiber fabric with a liquid epoxy system formed by mixing a non-aromatic epoxy diglycidyl ether resin selected from 1,6-hexanediol diglycidyl ether, 1,4-butanediol diglycidyl ether and 1,4-cyclohexanediol diglycidyl ether and one cycloaliphatic polyamine compound hardener having a viscosity of 300-400 mPa·s measured at 25° C. at a resin/hardener ratio in parts by weight of 100/67 to 100/96;
   b) and curing the impregnated fabric, characterized in that the epoxy system exhibits a viscosity less than 170 mPa·s measured at 25° C. and a tensile modulus lower than 15 MPa when cured and an onset of the glass transition temperature Tg at a temperature lower than 0° C. and the elastic composite material comprises 20 to 80 vol % of fibers, based on the total volume of the composite and exhibits a flexural modulus lower than 15 GPa.

2. Method according to claim 1 whereby the epoxy system exhibits a yellowness index lower than 20 after an exposure of 200 hrs in a weather-ometer WOM Xenon Ci 5000, according to SAE J 1960 test conditions.

3. Method according to claim 1 whereby the fiber fabric comprises carbon, glass, aramide or natural fibers.

4. Composite material obtained by a method according to claim 1.

5. Composite material according to claim 4 comprising from 30% to 70% volume fraction of fibers based on the total volume of the composite material.

6. Part of a car or racing car comprising a composite material according to claim 4.

7. Concrete comprising a composite material according to claim 4.

* * * * *